US010171017B2

(12) United States Patent
You et al.

(10) Patent No.: US 10,171,017 B2
(45) Date of Patent: Jan. 1, 2019

(54) IMAGE FORMING APPARATUS, MOTOR CONTROL APPARATUS, AND METHOD OF CONTROLLING A MOTOR

(71) Applicant: S-PRINTING SOLUTION CO., LTD., Suwon-si, Gyeonggi-do (KR)

(72) Inventors: Yong-ho You, Seoul (KR); Hak-young Kim, Seoul (KR); Ji-young Byun, Suwon-si (KR); Sang-hyuk Jung, Hwaseong-si (KR); Ho-bin Hwang, Hwaseong-si (KR)

(73) Assignee: HP PRINTING KOREA CO., LTD., Suwon-si (KR)

( * ) Notice: Subject to any disclaimer, the term of this patent is extended or adjusted under 35 U.S.C. 154(b) by 292 days.

(21) Appl. No.: 14/177,433

(22) Filed: Feb. 11, 2014

(65) Prior Publication Data
US 2014/0333250 A1 Nov. 13, 2014

Related U.S. Application Data

(60) Provisional application No. 61/820,806, filed on May 8, 2013.

(30) Foreign Application Priority Data

May 30, 2013 (KR) .................. 10-2013-0062155

(51) Int. Cl.
*H02P 27/08* (2006.01)
*H02P 6/12* (2006.01)
*H02P 6/14* (2016.01)
*H02P 8/38* (2006.01)
*H02P 8/12* (2006.01)

(52) U.S. Cl.
CPC . *H02P 8/38* (2013.01); *H02P 8/12* (2013.01)

(58) Field of Classification Search
CPC .......... H02P 25/105; B41J 2/315; G06T 19/20
See application file for complete search history.

(56) References Cited

U.S. PATENT DOCUMENTS

| 5,216,347 | A | * | 6/1993 | Pace | ................. | H02P 8/22 |
| | | | | | | 318/685 |
| 7,049,785 | B2 | | 5/2006 | Han | | |
| 8,508,175 | B2 | | 8/2013 | Hioki | | |
| 8,536,822 | B2 | * | 9/2013 | Webb | ................. | H02P 8/14 |
| | | | | | | 310/316.02 |
| 8,629,643 | B2 | * | 1/2014 | Tachibana | .......... | G03G 15/5004 |
| | | | | | | 318/400.42 |

(Continued)

FOREIGN PATENT DOCUMENTS

| KR | 1992-0013978 | 7/1992 |
| KR | 10-2004-0017175 | 2/2004 |

(Continued)

OTHER PUBLICATIONS

Extended European Search Report dated Oct. 6, 2014 in related European Application No. 14156192.8.

(Continued)

*Primary Examiner* — Bickey Dhakal
*Assistant Examiner* — Charles S Laughlin
(74) *Attorney, Agent, or Firm* — Staas & Halsey LLP

(57) ABSTRACT

An image forming apparatus may include an engine portion used to perform an image forming job, a step motor configured to start the engine portion, a driver including a resistor that measures current that flows to a coil of the step motor and is configured to provide a predetermined constant current to the step motor, and a drive controller configured to measure a load level of the step motor based on a voltage value of the resistor and to control the driver to provide the constant current that corresponds to the measured load level.

15 Claims, 24 Drawing Sheets

(56) References Cited

U.S. PATENT DOCUMENTS

| | | | |
|---|---|---|---|
| 2008/0112697 A1* | 5/2008 | Kim | G05B 19/416 |
| | | | 388/823 |
| 2008/0231220 A1* | 9/2008 | Tsujimoto | G03G 15/06 |
| | | | 318/476 |
| 2009/0066278 A1 | 3/2009 | Arisawa | |
| 2011/0068732 A1 | 3/2011 | Hioki | |
| 2011/0229235 A1 | 9/2011 | Tachibana et al. | |
| 2012/0007529 A1* | 1/2012 | Kim | H02P 6/08 |
| | | | 318/400.04 |
| 2013/0193895 A1 | 8/2013 | Noguchi et al. | |
| 2013/0293180 A1 | 11/2013 | Hioki | |

FOREIGN PATENT DOCUMENTS

| | | |
|---|---|---|
| KR | 10-2011-0021050 | 3/2011 |
| KR | 10-2011-0031085 | 3/2011 |
| KR | 10-2012-0000843 | 1/2012 |
| KR | 10-2013-0039765 | 4/2013 |

OTHER PUBLICATIONS

Microchip Technology Inc., Sorin Manea, "AN1307, Stepper Motor Control with dsPIC® DSCs", Mar. 26, 2009, pp. 1-26, Retrieved from the Internet: URL:http://www.microchip.com/stellent/groups/techpub_sg/documents/appnotes/en546027.pdf.

Microchip, "dsPICDEM™ MCSM Development Board User's Guide", Mar. 26, 2009, pp. 1-38, Retrieved from the Internet: URL: http://ww1.microchip.com/downloads/en/DeviceDoc/70610A.PDF.

PCT Search Report and Written Opinion issued in Application No. PCT/KR2013/008966 dated Feb. 18, 2014.

* cited by examiner

FIG. 16

| Reference Voltage PWM duty[%] | Vref [V] | Itrip max Current [A] | (Full step) Peak Current [A] | Max Torque [gfcm] |
|---|---|---|---|---|
| 100 | 3.3 | 1.88 | 1.31 | 1591 |
| 90 | 2.97 | 1.69 | 1.18 | 1430 |
| 80 | 2.64 | 1.50 | 1.05 | 1272 |
| 70 | 2.31 | 1.31 | 0.92 | 1113 |
| 60 | 1.98 | 1.13 | 0.79 | 954 |
| 50 | 1.65 | 0.94 | 0.66 | 795 |
| 40 | 1.32 | 0.75 | 0.53 | 636 |

IMAGE FORMING APPARATUS, MOTOR CONTROL APPARATUS, AND METHOD OF CONTROLLING A MOTOR

CROSS-REFERENCE TO RELATED APPLICATIONS

This application claims priority under 35 U.S.C. § 119(a) to Korean Patent Application No. 10-2013-0062155, filed on May 30, 2013, in the Korean Intellectual Property Office and priority under 35 U.S.C. § 120 from U.S. Provisional Patent Application No. 61/820,806 filed on May 8, 2013, in the United States Patent and Trademark Office, the disclosure of which is incorporated herein by reference in its entirety.

BACKGROUND OF THE INVENTION

1. Field of the Invention

The present disclosure relates to an image forming apparatus, a motor control apparatus, and a method of controlling a motor, and more particularly to an image forming apparatus, a motor control apparatus, and a method of controlling a motor, which can sense a load of a step motor and vary constant current supplied to the step motor according to the sensed load.

2. Description of the Related Art

An image forming apparatus is an apparatus which performs generation, printing, reception, and transmission of image data, and representative examples thereof may be a printer, a copy machine, a facsimile, and a multifunction peripheral (MFP) in which functions of the above-described devices are combined.

In such an image forming apparatus, motors for performing various functions, such as conveyance of print sheets and feeding of print sheets, are used. Recently, as optional units that perform various functions, such as an ADF (Auto Document Feeder) unit, a finisher unit, an HCF (High Capacity Feeder) unit, and a DCF (Double Capacity Feeder) unit, can be attached to the image forming apparatus, the number of motors that can be used in the image forming apparatus is gradually increased.

In a recent image forming apparatus, a step motor (or a pulse motor or a stepping motor) is used to precisely control the conveyance of print sheets. Here, the step motor is a motor that moves by predetermined angles to correspond to the number of input pulses. Since the number of input pulses is completely in proportion to a rotating angle of the motor, the rotating angle of the motor can be accurately controlled.

Although the step motor as described above can be driven in various driving methods, a constant current driving method has been widely used. Here, the constant current driving method is a method to make constant current that is always a constant flow to a coil of the step motor regardless of a load that is applied to the step motor.

On the other hand, if the load of the system is increased and a necessary current amount becomes larger than the fixed inflow current amount, the step motor may be stepped out, and in the constant current driving method in the related art, a current amount that is larger than the necessary current amount is supplied to the step motor.

However, if the current amount that is larger than the necessary current amount is supplied, the remaining current amount (current that is not consumed for motor driving), causes vibration, noise, and heating of the motor. Further, due to the oversupplied motor inflow current, unnecessary power consumption may occur.

Further, a motor having a larger capacity than the motor having the rated capacity, which is necessary for actual use, should be used, and this may cause the material cost of the motor components to be increased. If the load is increased due to output abnormality although a large current amount is supplied to the step motor, it is still possible that the step motor is stepped out.

SUMMARY OF THE INVENTION

The present disclosure addresses at least the above problems and/or disadvantages and provides at least the features and utilities described below. Accordingly, exemplary embodiments of the present disclosure provides an image forming apparatus, a motor control apparatus, and a method of controlling a motor, which can sense the load of a step motor and vary constant current supplied to the step motor according to the sensed load.

Additional features and utilities of the present general inventive concept will be set forth in part in the description which follows and, in part, will be obvious from the description, or may be learned by practice of the general inventive concept.

Exemplary embodiments of the present disclosure may provide an image forming apparatus that includes: an engine portion used to perform an image forming job; a step motor configured to start the engine portion; a driver including a resistor for measuring current that flows to a coil of the step motor and configured to provide predetermined constant current to the step motor; and a drive controller configured to measure a load level of the step motor based on a voltage value of the resistor and to control the driver to provide the constant current that corresponds to the measured load level.

In this case, the drive controller may include a sensor configured to sense the voltage value of the resistor; a calculator configured to calculate the load level of the step motor based on the sensed voltage value; a determinator configured to determine a level of the constant current to be supplied to the step motor based on the calculated load level; and an outputter configured to output a control value that corresponds to the determined constant current level to the driver.

The sensor may smooth and sense the voltage value of the resistor.

The sensor may include a low pass filter connected to one terminal of the resistor of the driver, and sense an output voltage of the low pass filter as the voltage value of the resistor.

The calculator may calculate the load level of the step motor based on the sensed voltage value and the control value that is applied to the driver.

The calculator may calculate the load level of the step motor based on a following equation, $$Vload = Vsens * Gsens - (Vref \times Gref)$$

where, Vload denotes the voltage value that corresponds to the calculated load level, Vsens denotes the voltage value of the resistor, Vref denotes the constant current control value input to the driver, and Gsens and Gref are gain values.

The determinator may determine the constant current that corresponds to the calculated load level using a lookup table having the constant current level that corresponds to levels of a plurality of loads.

The determined constant current may be obtained by adding predetermined margin current to necessary constant current of the calculated load level.

The drive controller may determine whether the step motor is normally operated through comparison of the measured load level with pre-stored load level information during the normal operation.

A plurality of step motors and drivers may be provided, and the drive controller may measure load levels of the plurality of step motors and control the plurality of drivers to provide constant current that corresponds to the measured load levels.

Exemplary embodiments of the present disclosure may also provide a motor control apparatus that includes: a step motor; a driver including a resistor to measure current that flows to a coil of the step motor and configured to provide predetermined constant current to the step motor; and a drive controller configured to measure a load level of the step motor based on a voltage value of the resistor and to control the driver to provide the constant current that corresponds to the measured load level.

In this case, the drive controller may include a sensor configured to sense the voltage value of the resistor; a calculator configured to calculate the load level of the step motor based on the sensed voltage value; a determinator configured to determine a constant current level to be supplied to the step motor based on the calculated load level; and an outputter configured to output a control value that corresponds to the determined constant current level to the driver.

The sensor may smooth and sense the voltage value of the resistor.

The sensor may include a low pass filter connected to one terminal of the resistor of the driver, and sense an output voltage of the low pass filter as the voltage value of the resistor.

The calculator may calculate the load level of the step motor based on the sensed voltage value and the control value that is applied to the driver.

The calculator may calculate the load level of the step motor based on a following equation, $$Vload = Vsens * Gsens - (Vref \times Gref)$$

where, Vload denotes the voltage value that corresponds to the calculated load level, Vsens denotes the voltage value of the resistor, Vref denotes the constant current control value input to the driver, and Gsens and Gref are gain values.

The determinator may determine the constant current that corresponds to the calculated load level using a lookup table having the constant current level that corresponds to levels of a plurality of loads.

The determined constant current may be obtained by adding predetermined margin current to necessary constant current of the calculated load level.

The determinator may store a predetermined constant current value, a predetermined first load level value, and a predetermined second load level value, and if the calculated load level is higher than the predetermined first load level value, the determinator may increase the predetermined constant current value, the predetermined first load level value, and the predetermined second load level value, and determine the increased constant current value as the constant current that corresponds to the calculated load level, while if the calculated load level is lower than the predetermined second load level value, the determinator may decrease the predetermined constant current value, the predetermined first load level value, and the predetermined second load level value, and determine the decreased constant current value as the constant current that corresponds to the calculated load level.

According to exemplary embodiments of the present disclosure, a method of controlling a step motor includes: receiving a control command for the step motor; and providing predetermined constant current to the step motor according to the control command, wherein the step of providing the constant current measures a load level of the step motor based on a level of current that flows to a coil of the step motor, and provides the constant current that corresponds to the measured load level.

Exemplary embodiments of the present disclosure may also provide an image forming apparatus comprising: an engine portion used to perform an image forming job; a step motor configured to start the engine portion; and a drive controller configured to measure a load level of the step motor based on a current that flows through a coil of the step motor and to provide a predetermined constant current to the step motor which corresponds to the measured load level.

In an exemplary embodiment, the drive controller comprises: a sensor configured to sense a voltage value based on the current that flows through the coil; a calculator configured to calculate the load level of the step motor based on the sensed voltage value; a determinator configured to determine a level of the constant current to be supplied to the step motor based on the calculated load level; and an outputter configured to output a control value that corresponds to the determined constant current level to the drive controller.

In an exemplary embodiment, the calculator calculates the load level of the step motor based on the sensed voltage value and the control value that is applied to the drive controller.

In an exemplary embodiment, the calculator calculates the load level of the step motor based on a following equation, $$Vload = Vsens * Gsens - (Vref \times Gref)$$

where, Vload denotes the voltage value that corresponds to the calculated load level, Vsens denotes the sensed voltage value, Vref denotes the constant current control value input to the drive controller, and Gsens and Gref are gain values.

In an exemplary embodiment, the determinator determines the constant current that corresponds to the calculated load level using a lookup table having the constant current level that corresponds to levels of a plurality of loads.

In an exemplary embodiment, the drive controller comprises: a load sensing device configured to sense a voltage value based on the current that flows through the coil and to calculate the load level of the step motor based on the sensed voltage value; a determinator configured to determine a level of the constant current to be supplied to the step motor based on the calculated load level; and an outputter configured to output a control value that corresponds to the determined constant current level to the drive controller.

Exemplary embodiments of the present general inventive concept may also provide a motor control apparatus, comprising: a step motor; and a drive controller configured to measure a load level of the step motor based on a current that flows through a coil of the step motor and to provide a predetermined constant current to the step motor which corresponds to the measured load level.

In an exemplary embodiment, the drive controller comprises: a sensor configured to sense a voltage value based on the current that flows through the coil; a calculator configured to calculate the load level of the step motor based on the sensed voltage value; a determinator configured to determine a level of the constant current to be supplied to the step motor based on the calculated load level; and an outputter configured to output a control value that corresponds to the determined constant current level to the drive controller.

In an exemplary embodiment, the calculator calculates the load level of the step motor based on the sensed voltage value and the control value that is applied to the drive controller.

In an exemplary embodiment, the calculator calculates the load level of the step motor based on a following equation, $$Vload = Vsens * Gsens - (Vref \times Gref)$$

where, Vload denotes the voltage value that corresponds to the calculated load level, Vsens denotes the sensed voltage value, Vref denotes the constant current control value input to the drive controller, and Gsens and Gref are gain values.

In an exemplary embodiment, the determinator determines the constant current that corresponds to the calculated load level using a lookup table having the constant current level that corresponds to levels of a plurality of loads.

Exemplary embodiments of the present disclosure may also provide a non-transient computer readable medium that contains a method of controlling a step motor, the method comprising: receiving a control command for the step motor; and providing a predetermined constant current to the step motor according to the control command, the step of providing the constant current includes measuring a load level of the step motor based on a level of current that flows to a coil of the step motor, and providing the constant current that corresponds to the measured load level to the step motor.

BRIEF DESCRIPTION OF THE DRAWINGS

The above and other features and utilities of the present disclosure will be more apparent from the following detailed description when taken in conjunction with the accompanying drawings, in which:

FIG. 16 is a diagram illustrating an example of a lookup table according to this embodiment;

DETAILED DESCRIPTION OF THE PREFERRED EMBODIMENTS

Figure 1:
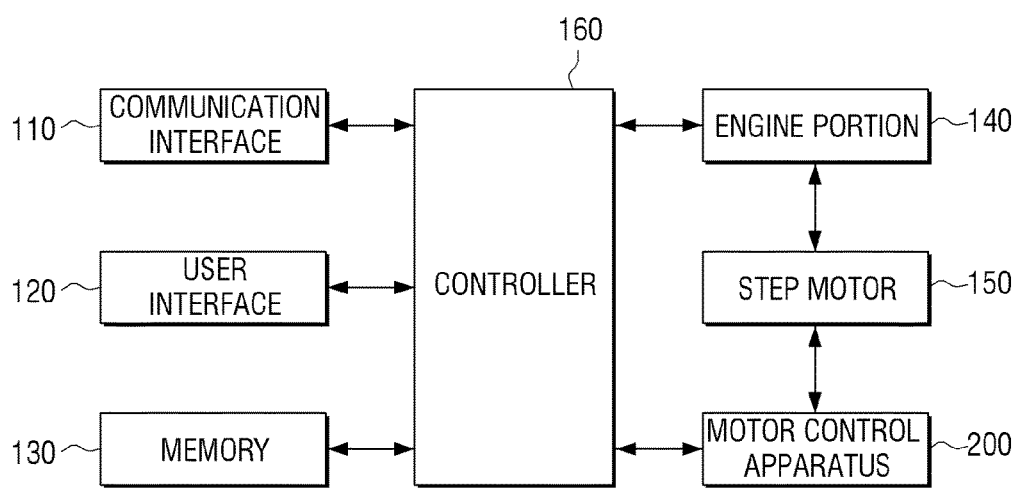
FIG. 1 is a diagram illustrating the configuration of an image forming apparatus according to an exemplary embodiment of the present disclosure.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

FIG. 1 is a diagram illustrating the configuration of an image forming apparatus according to an exemplary embodiment of the present disclosure.

Referring to FIG. 1, an image forming apparatus 100 includes a communication interface 110, a user interface 120, a memory 130, an engine portion 140, a step motor 150, a controller 160, and a motor control apparatus 200.

Here, the image forming apparatus 100 is an apparatus which performs generation, printing, reception, and transmission of image data, and may be a printer, a copy machine, a facsimile, and a multifunction peripheral (MFP) in which functions of the above-described devices are combined. In this embodiment, it is described that the present disclosure is applied to the image forming apparatus to form an image, but the present disclosure may also be applied to an image reading apparatus, such as a scanner.

The communication interface 110 is connected to a print control terminal device (not illustrated), such as a PC, a notebook PC, a PDA, and a digital camera. The communication interface 110 is formed to connect the image forming apparatus 100 to an external device. Specifically, the communication interface 110 may connect to a print control terminal device through not only a LAN (Local Area Network) and the Internet, but also through a USB (Universal Serial Bus) port. Further, the communication interface 110 may be implemented to connect to the print control terminal device not only in a wired method, but also in a wireless method. Any wireless-type communication methods that perform the intended purposes as described herein may be implemented for communication between the image forming apparatus and a print control terminal device.

The communication interface 110 receives print data from the print control terminal device. Further, if the image forming apparatus 100 has a scanner function, the communication interface 110 may transmit generated scan data to the print control terminal device or an external server (not illustrated).

The user interface 120 is provided with a plurality of functions keys for a user to set or select various types of functions supported by the image forming apparatus 100, and displays various types of information provided from the image forming apparatus 100. The user interface 120 may be implemented by a device on which input and output operations are simultaneously performed, such as a touch screen, or a device through a combination of a mouse (or a keyboard or a plurality of buttons) and a monitor. The user can control a print operation of the image forming apparatus 100 using a user interface window provided through the user interface 120.

Further, the user interface 120 displays the operation state of the image forming apparatus 100. Specifically, the user interface 120 may display whether a step motor to be described later is in a normal operation state. For example, if the step motor is overloaded or the step motor is stepped out, the user interface 120 may display the corresponding information to the user.

The memory 130 stores print data. Specifically, the memory 130 stores print data that is received through the communication interface 110. Then, the memory 130 may store lookup data to control the step motor 150. Here, the lookup table may be an acceleration table having pulse cycle information for driving speeds of the step motor, and may be a lookup table for torque values that correspond to a plurality of load voltages Vload, or a lookup table for constant current control voltages Vref values or control voltage values) that correspond to the plurality of load voltages Vload.

In the current exemplary embodiment, it is described that the memory 130 stores the lookup table. During implementation, however, the lookup table may be stored in the motor control apparatus 200 to be described later.

The memory 130 may store load information of the step motor 150. Specifically, the memory 130 may store load information that is transferred from the motor control apparatus 200.

The memory 130 may be implemented by a storage medium in the image forming apparatus 100 or an external storage medium, for example, a removable disk including a USB memory or a web server through a network.

The engine portion 140 performs an image forming job. Specifically, the engine portion 140 may perform the image forming job under the control of the controller 160 and the start of the step motor 150. In this embodiment, it is described that the engine portion 140 performs only the image forming job. However, if the image forming apparatus 100 is a scanner that can perform scan operations or a multifunction peripheral apparatus, the engine portion 140 may be configured to perform an image reading operations.

The step motor 150, which is provided inside the image forming apparatus 100, may receive a pulse input and power supply, and operate at constant speed or acceleration speed according to the pulse input. The step motor 150 may perform a normal operation or a reverse operation according to the phase order of the pulse input. Here, the step motor 150 may be a motor to perform various functions of the image forming apparatus, such as OPC driving, fuser driving, and sheet conveyance.

The motor control apparatus 200 generates a driving signal for the step motor 150 according to a control command. The detailed configuration and operation of the motor control apparatus 200 will be described later with reference to FIG. 2.

The motor control apparatus 200 may measure a load level of the step motor 150, and provide the measured load level to the controller 160 as load information. A method of measuring the load level of the motor control apparatus 200 will be described later with reference to FIG. 2.

The controller 160 controls the respective configurations in the image forming apparatus 100. Specifically, if print data is received from a print control terminal device, the controller 160 controls the operation of the engine portion 140 to print the received print data, and transmits a control command for the step motor 150 that starts the engine portion 140 to the motor control apparatus 200. For example, the controller 160 may transmit the control command, such as a start/stop of rotation of the step motor 150, an acceleration/deceleration, or a speed command value, to the motor control apparatus 200.

The controller 160 receives the load information of the step motor 150 from the motor control apparatus 200, and determines whether the step motor 150 is in a normal operation state based on the received load information. If it is determined that the step motor 150 is in an abnormal operation state, the controller 160 may control the user interface 120 to display a warning message. As described above, the controller 160 determines whether the step motor 150 is in a normal operation state. During implementation, however, the motor control apparatus 200 may determine whether the step motor 150 is in a normal operation state, and if the step motor 150 is in an abnormal operation state, the motor control apparatus 200 may transfer the corresponding message to the controller 160.

As described above, the image forming apparatus 100 according to this embodiment may receive the load information of the step motor 150 and thus quantitatively calculate the load amount of the step motor 150. Further, the image forming apparatus 100 may determine whether the step motor 150 is in a normal/abnormal operation state based on the provided load information of the step motor 150 received from the motor control apparatus 200, and provide the corresponding information to the user and a manager.

On the other hand, FIG. 1 illustrates that the step motor 150 and the motor control apparatus 200 are separately configured. During implementation, however, the step motor 150 may be implemented as a configuration in the motor control apparatus 200. Hereinafter, an exemplary detailed configuration of the motor control apparatus 200 will be described with reference to FIG. 2.

Figure 2:
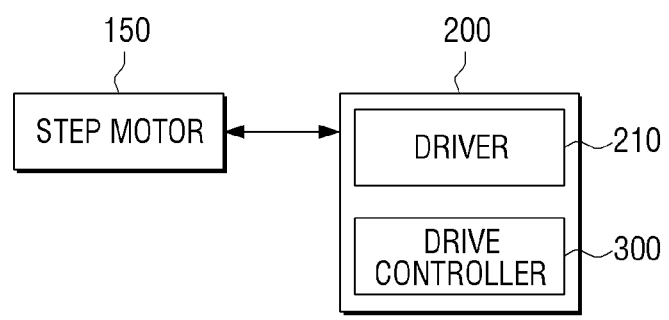
FIG. 2 is a diagram illustrating the detailed configuration of a motor control apparatus in FIG. 1.

FIG. 2 is a diagram illustrating a detailed configuration of a motor control apparatus in the exemplary embodiment of FIG. 1.

Referring to FIG. 2, the motor control apparatus 200 according to this embodiment may include a driver 210 and a drive controller 300. In the illustrated example, it is illustrated that the motor control apparatus 200 is not provided with the step motor 150. During implementation, however, the motor control apparatus 200 may be provided to include the step motor 150.

The driver 210 may include a resistor configured to measure current that flows to the coil of the step motor 150, and can provide a predetermined constant current to the step motor 150. Specifically, the driver 210 may provide the predetermined constant current to the step motor 150 based on the driving signal and a current reference value Vref (hereinafter called a "constant current control value") that are transferred from the drive controller 300. The detailed configuration and operation of the driver 210 will be described later with reference to FIG. 4. In an alternative embodiment, the drive controller 300 may directly measure current that flows to the coil of the step motor 150 and provide the predetermined constant current to the step motor 150 based on the driving signal and a current reference value Vref (hereinafter called a "constant current control value") that are transferred from the drive controller 300. Thus the drive controller 300 may perform the operations of both the drive controller 300 and the driver 210.

Referring back to FIG. 2, the drive controller 300 can receive the control command from the controller 160, and can control the driving state of the step motor 150 through controlling the driver 210. Specifically, the drive controller 300 may receive the control command for the step motor 150 from the controller 160. Here, the control command may include a start/stop of rotation of the step motor 150, an acceleration/deceleration, and a speed command value.

The above-described control command may be received from the controller 160 through an SPI (Serial Peripheral Interface), which is an interface that enables two devices to exchange data through serial communication and a serial communication interface such as I$^2$C that is a bidirectional serial bus.

Then, the drive controller 300 generates a driving signal for the step motor 150 according to the received control command. Specifically, the drive controller 300 may generate the driving signal using pulse cycle information of a speed change period that corresponds to the control command in the acceleration table. Here, the acceleration table is a table having the pulse cycle information by driving speeds of the step motor 150. The acceleration table may be stored within the drive controller 300, may be stored in the above-described memory 130, or may be read by the drive controller 300 if needed.

When the driving signal is generated, the drive controller 300 may measure the load level of the step motor 150, and may control the driver 210 to provide the constant current that corresponds to the measured load level to the step motor 150. Such operations will be described later with reference to FIG. 3.

The drive controller 300 may provide the measured load level to the controller 160. Further, the drive controller 300 may determine whether the step motor 150 is in a normal operation state through comparison of the measured load level with the pre-stored load level information during the normal operation. Such operations of the drive controller 300 will be described later with reference to FIG. 22.

As described above, the motor control apparatus 200 according to this embodiment can sense the load level of the step motor 150, and provide optimized constant current to the step motor 150 according to the sensed load. Accordingly, the load change of the motor can be observed in real time in a set operation state, and the load amount can be quantitatively calculated. Further, it is possible to determine the normal/abnormal state of the system load, and if an abnormal load state is sensed, it is possible to provide notification of the abnormal state or to perform a feedback control.

Figure 23:
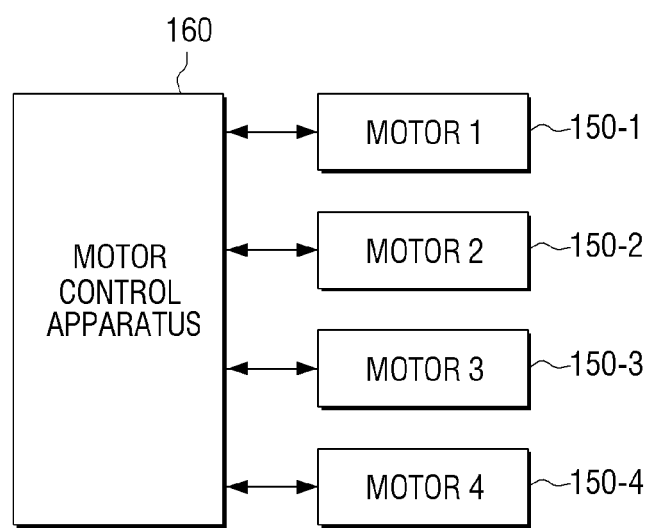
FIG. 23 is a diagram illustrating an image forming apparatus according to another exemplary embodiment of the present disclosure.

FIG. 2 illustrates that one motor control apparatus 200 controls one step motor 150. However, as illustrated in FIG. 23, one motor control apparatus 200 may be implemented to control two or more step motors, or one motor control apparatus 200 may be implemented to control a BLDC motor and a DC motor together with the step motor 150.

Further, FIG. 2 illustrates that the driver 210 and the drive controller 300 are separately configured. During the implementation, however, the driver 210 and the drive controller 300 may be implemented as one configuration. Furthermore, as described above, the drive controller 300 may be configured to perform the operations of both the drive controller 300 and the driver 210 to directly control the step motor 150.

Figure 3:
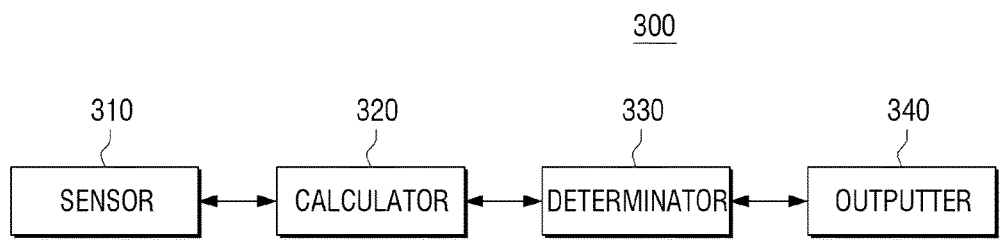
FIG. 3 is a diagram illustrating the detailed configuration of a drive controller in FIG. 2.

FIG. 3 is a diagram illustrating the detailed configuration of a drive controller in FIG. 2.

Referring to FIG. 3, the drive controller 300 may include a sensor 310, a calculator 320, a determinator 330, and an outputter 340.

The sensor 310 may sense a voltage value of a sensing resistor. Specifically, the sensor 310 may sense the voltage value of a sensing resistor of the driver 210. In this case, the sensor 310 may output the volume of the sensed voltage value of the sensing resistor as the measured value. Specifically, the volume of the voltage of the sensing resistor is a factor that is varied in proportion to the load level of the step motor 150, and the sensor 310 may include a low pass filter connected to one terminal of the sensing resistor, and provide an output voltage of the low pass filter as the sensed voltage value Vsens. In this embodiment, it is described that the volume of the voltage of the sensing resistor is sensed using the low pass filter. During implementation, however, any element that can output the volume of the voltage may be implemented using an integrator, a charge pump, or the like.

The calculator 320 calculates the load level of the step motor based on the sensed voltage value Vsens (strictly, the volume voltage value of the voltage of the sensing resistor, and for easiness in explanation, hereinafter called the "sensed voltage value"). Specifically, the calculator 320 may calculate the load level of the step motor through multiplication of the sensed voltage value output from the sensor 310 by a predetermined gain value.

The calculator 320 may calculate the load level of the step motor using the sensed voltage value Vsens and constant current control value Vref. In this case, the calculator 320 may calculate the load level of the step motor based on Equation 1 to be described later. At this time, the calculator 320 may output the calculated load level as a voltage value Vload. Hereinafter, the output voltage value Vload is called a load voltage value.

The determinator 330 determines the level of the constant current to be supplied to the step motor based on the calculated load level. Specifically, the determinator 330 may determine the constant current level that corresponds to the calculated load level through a calculation method or by using a pre-stored lookup table. It is preferable that the constant current level determined by such a method is obtained by adding predetermined margin current to the necessary constant current of the calculated load level. The detailed operation of the determinator 330 will be described later with reference to FIGS. 15 and 16.

Further, the determinator 330 may perform high/low limit control with respect to the calculated load level. Specifically, the determinator 330 may store a predetermined constant current value, a predetermined first load level value, and a predetermined second load level value, and if the calculated load level is higher than the predetermined first load level value, the determinator 330 may increase the predetermined constant current value, the predetermined first load level value, and the predetermined second load level value, and determine the increased constant current value as the constant current that corresponds to the calculated load level, while if the calculated load level is lower than the predetermined second load level value, the determinator 330 may decrease the predetermined constant current value, the predetermined first load level value, and the predetermined second load level value, and determine the decreased constant current value as the constant current that corresponds to the calculated load level. The detailed operation and configuration of the determinator 330 will be described later with reference to FIGS. 18 to 21.

The outputter 340 outputs a control value Vref that corresponds to the determined constant current level to the driver 210. In this embodiment, it is illustrated that the determinator 330 and the outputter 340 are separately configured. During implementation, however, the determinator 330 and the outputter 340 may be implemented as one configuration.

As described above, the drive controller 300 according to this embodiment may sense the load degree of the step motor 150. Accordingly, during implementation, only the configuration of the sensor 310 and the calculator 320 may be used as a load sensing device of the step motor. Further, the drive controller 300 may sense the load degree using the voltage value of the sensing resistor. That is, the drive controller 300 may sense the load degree regardless of the excitation method of the step motor, and may sense the load level in all load states, such as full/half/quarter load states.

In the related art, the load information of the step motor is unable to be sensed, and thus current that is higher than the necessary current is supplied to the step motor. In this embodiment, the load information of the step motor can be sensed, and the constant current can be varied to correspond to the sensed load information.

FIG. 3 illustrates that the drive controller 300 is implemented through a plurality of configurations. During implementation, however, at least two configurations may be implemented as one configuration. For example, the sensor 310 and the calculator 320 may be implemented as the load sensing device as described above, and the determinator 330 and the outputter 340 may be implemented as one configuration. Further, the calculator 320, the determinator 330, and the outputter 340 may be implemented into one ASIC chip. That is, only the sensor 310 may be implemented as a hardware configuration, and the remaining configurations may be implemented to operate by software in one configuration.

Further, during implementation, the sensor 310, the calculator 320, the determinator 330, and the outputter 340 may be implemented as an ASIC chip having an ADC.

Figure 4:
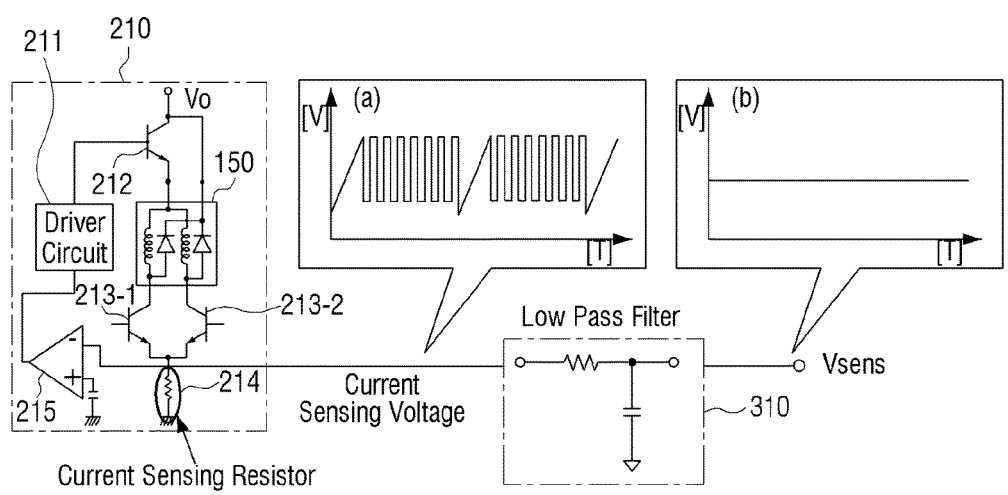
FIG. 4 is a diagram illustrating the detailed configuration of a driver in FIG. 2.

FIG. 4 is a diagram illustrating the detailed configuration of a driver in FIG. 2.

Referring to FIG. 4, the driver 210 includes a driver circuit 211, a first switch 212, a coil selector 213, a sensing resistor 214, and a comparator 215.

The driver circuit 211 receives the driving signal and the constant current control value (Vref or the constant current control value), and controls the first switch 212 and the coil selector 213 based on the received driving signal and constant current control value Vref. The driver circuit 211 may be a general commercial IC that controls the constant current for the step motor.

The first switch 212 operates to be turned on/off according to the control of the driver circuit 211. Specifically, in a period where the driving signal is in an on state, the first switch 212 is turned on until a predetermined constant current level is supplied to the step motor 150. If the predetermined constant current is supplied to the step motor 150, the first switch 212 repeats on/off operations under the control of the driving circuit 211 so that the constant current is supplied to the step motor 150.

If one of two switches 213-1 and 213-2 is operated under the control of the driver circuit 211, the coil selector 213 may selectively supply the current to a plurality of coils of the step motor 150. In this embodiment, it is illustrated that two switches are used. However, the configuration of the coil selector 213 may be changed depending on the excitation method of the step motor 150.

The sensing resistor 214 is a resistor to measure current that flows to the coil of the step motor 150. One end of the sensing resistor 214 is connected to one end of the coil selector 213, and the other end thereof is grounded.

The comparator 215 compares the voltage value of the sensing resistor 214 with a predetermined voltage value, and outputs the result of the comparison to the driving circuit 211. Specifically, the comparator 215 may be implemented as an operational amplifier OP-Amp, and in this case, the negative terminal of the comparator 214 may be connected to the one terminal of the sensing resistor 214, and the positive terminal thereof may receive the predetermined voltage value and output the result of the comparison to the driving circuit 211.

Here, the voltage value of the sensing resistor 214 is a value that corresponds to the change of the current that flows to the coil of the step motor 150. The comparator 215 compares the current that flows to the coil of the step motor 150 with predetermined peak current, and the driver circuit 211 controls the on/off operation of the first switch 212 depending on whether the current that flows to the coil of the step motor 150 is the peak current. Accordingly, as illustrated in an area (a) of FIG. 4, the voltage value of the sensing resistor 214, which corresponds to the change of the current that flows to the step motor 150, repeats rising and chopping operations.

As described above, while the driver 210 is operating, the sensor 310 senses the voltage value of the sensing resistor 214.

In the graph ((a) in FIG. 4) that represents the voltage value of the sensing resistor 214, the area (or volume) of the voltage value of the sensing resistor 214 is a factor that corresponds to the load level of the step motor 150. In order to output the value that corresponds to the load level, that is, in order to output an integration value (sensed voltage value) for the voltage value of the sensing resistor 214, the sensor 310 uses a low pass filter.

In this embodiment, the low pass filter is configured using a resistor and a capacitor. During implementation, however, the low pass filter may be configured using an inductor and a capacitor, and may be implemented in the N-th order that is equal to or higher than the second order. Further, an active filter (i.e., integrator) may be implemented using an operational amplifier OP-amp.

Hereinafter, the reason why the sensed voltage value can be used as the load information will be described with reference to FIGS. 5 to 11.

Figure 5:
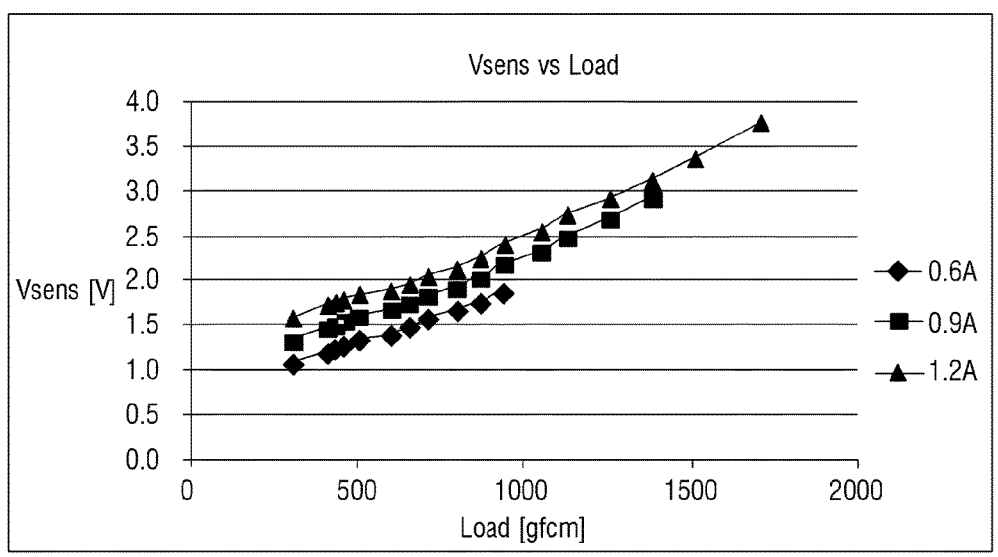
FIG. 5 is a diagram explaining the relationship between voltage of a sensed voltage value and a load.

FIG. 5 is a diagram explaining the relationship between the sensed voltage value and the load. Specifically, FIG. 5 shows a graph representing the relationship between the sensed voltage value and the load in the case where the load of the motor end is increased on the same motor, speed, and current conditions. The horizontal axis of the graph represents the load level, and the vertical axis thereof represents the sensed voltage value Vsens. Here, the sensed voltage value is a value obtained by integrating the output value of the low pass filter as illustrated in FIG. 4, that is, the voltage of the sensing resistor 214.

Referring to FIG. 5, it can be seen that the sensed voltage value is linearly increased as the load level is increased. The sensed voltage value is changed in proportion to the load level, and may be used as a value that corresponds to the load of the step motor 150.

Figure 6:
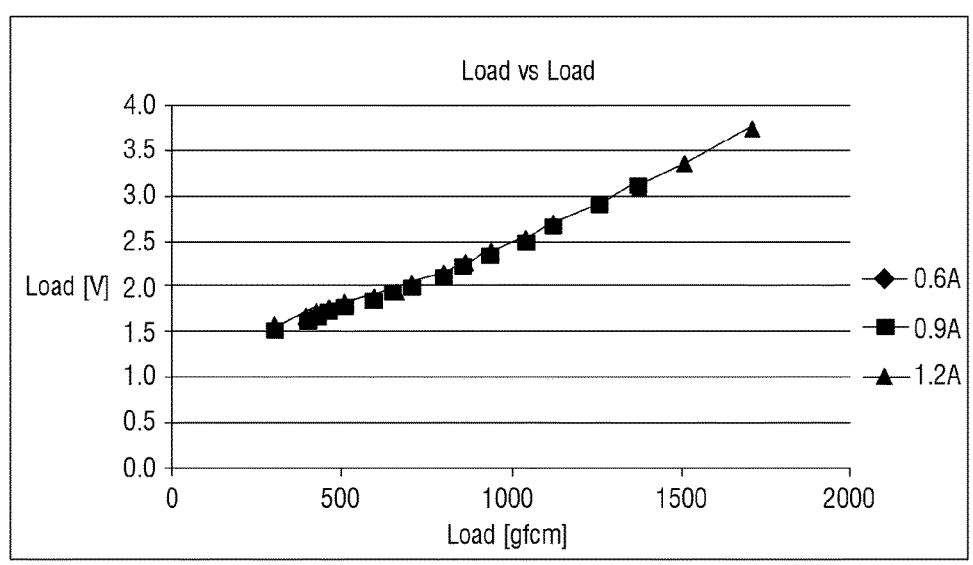
FIG. 6 is a diagram explaining the relationship between a corrected sensed voltage value and a load.

On the other hand, even in the case where the input current is increased as illustrated in FIG. 5, it can be seen that the sensed voltage value is changed according to the increment amount of the input current. Accordingly, in order to obtain the value that is linearly changed only by the change of the load without the influence of the input current value as illustrated in FIG. 6, the sensed voltage may be corrected using the constant current control value Vref that corresponds to the input current. This will be described hereinafter with reference to FIG. 6.

FIG. 6 is a diagram explaining the relationship between the corrected sensed voltage value and the load.

Referring to FIG. 6, it can be confirmed that the sensed voltage that is corrected regardless of the change of the input current is changed according to the load level. The sensed voltage that is changed only by the load is called a load voltage Vload. The load voltage is expressed in Equation 1 below:

$$Vload = Vsens * Gsens - (Vref \times Gref) \quad \text{[Equation 1]}$$

where Vload denotes the voltage (i.e., load voltage) that corresponds to the calculated load level, Vsens denotes the sensed voltage value, Vref denotes the constant current control value input to the driver, and Gsens and Gref are gain values.

The sensed voltage value Vsens and the constant current control value Vref are values that can be known through sensing, and hereinafter, a method of determining the gain value Gref will be described.

Preferentially, step motors having the same load start, and constant current control value Vref is applied thereto up to an initial ramp-up time point. Here, the constant current control value is a value having a sufficiently large load margin (e.g., Vref PWM duty=100%). Then, after the ramp-up, Gref is calculated in a steady period using Equation 2 below.

$$Vload1 = Vload2 \text{ (the same load condition)}$$

$$Vsens1 * Gsens - Vref1 * Gref = Vsens2 * Gsens - Vref2 * Gref \rightarrow Gref = Gens * (Vsens1 - Vsens2) / (Vref1 - Vref2) \quad \text{[Equation 2]}$$

Here, the gain Gsens is a gain by which the sensed voltage value Vsens is multiplied in order to increase the control resolution of the sensed voltage value Vsens, and "Vsens× Gsens" value may have a value in a possible wide range that is equal to or lower than a control logic power level. Further, the maximum value of the amplifier output may be set to be smaller than the upper limit value of the amplifier output, and may have a value of "1".

The above-described Equation 2 is under the assumption that even different input currents should have the same load voltage Vload on the same load condition. Accordingly, two different constant current control values Vref1 and Vref2 are input on the same set load condition, and the sensed voltage values Vsens1 and Vsens2 by the respective constant current control values are sensed to derive the Gref value.

For example, the sensed voltage value 100% is sensed and stored in a state where Vref PWM duty 100% is applied in a steady period, and after a predetermined time, the sensed voltage value 80% is sensed and stored in a state where Vref PWM duty 80% is applied. Then, by applying the previously defined Gsens gain value, the final Gref value can be derived through the above-described equations.

The gain Gref may be measured and recorded in advance by a manufacturer in a factory shipment procedure, or may be calculated by the image forming apparatus 100 itself. For example, in order to sense the same load voltage Vload even if the motor components or driving conditions are changed, the above-described Gref calculation process may be performed when the condition change is sensed. Further, in the case where motors having different resistance values are commonly used in the same system, or there is a large difference in resistance value between the motors, the above-described calculation operations may be performed for the respective motors.

Hereinafter, the principle of sensing the load change through the sensed voltage value will be described with reference to FIGS. 7 to 11.

Figure 7:
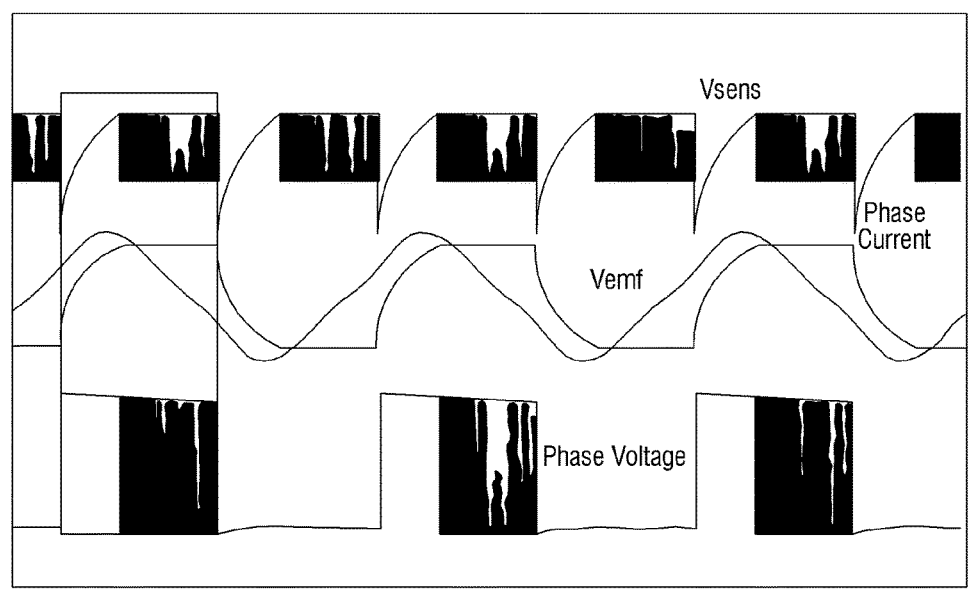
FIG. 7 is a waveform diagram of phase current and phase voltage when the step motor is in a normal operation state.
Figure 8:
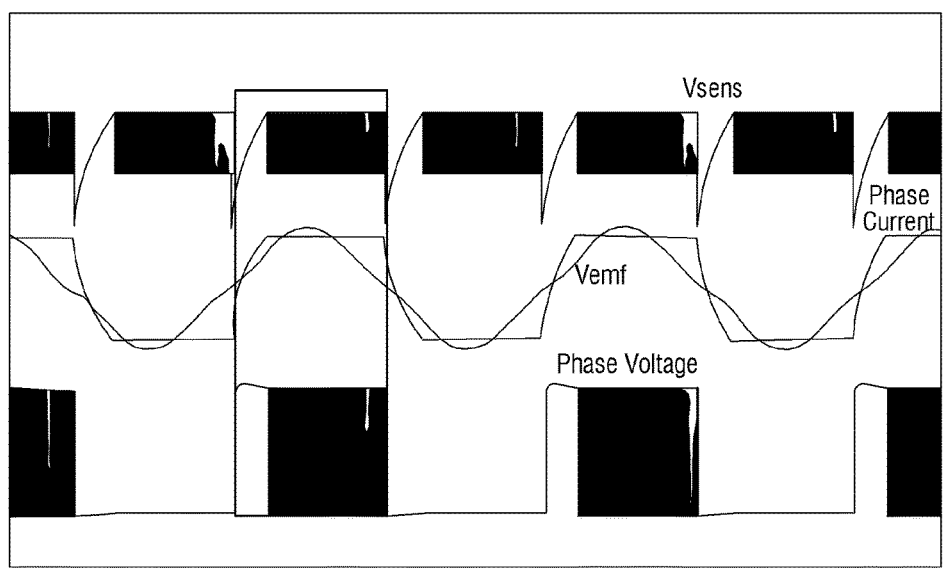
FIG. 8 is a waveform diagram of phase current and phase voltage just before the step motor is stepped out.
Figure 9:
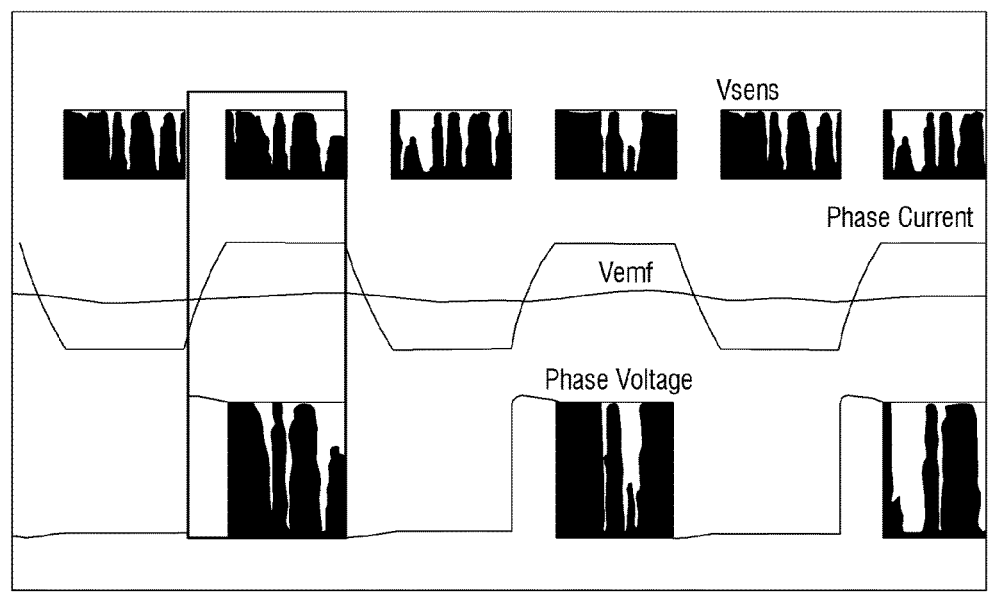
FIG. 9 is a waveform diagram of phase current and phase voltage when the step motor is stepped out.

FIG. 7 is a waveform diagram of phase current and phase voltage when the step motor is in a normal operation state, FIG. 8 is a waveform diagram of phase current and phase voltage just before the step motor is stepped out, and FIG. 9 is a waveform diagram of phase current and phase voltage when the step motor is stepped out.

In the step motor a phase difference occurs between an input pulse and a back EMF (ElectroMotive Force) depending on the load degree that is applied to the motor.

If the load is low as shown in FIG. 7, the phase of the back EMF Vemf precedes the phase of the applied current. If the load is low as described above, an initial current rising period in a constant current on period is greatly influenced by the back EMF to lengthen the time interval, and the current chopping period is relatively shortened.

Figure 10:
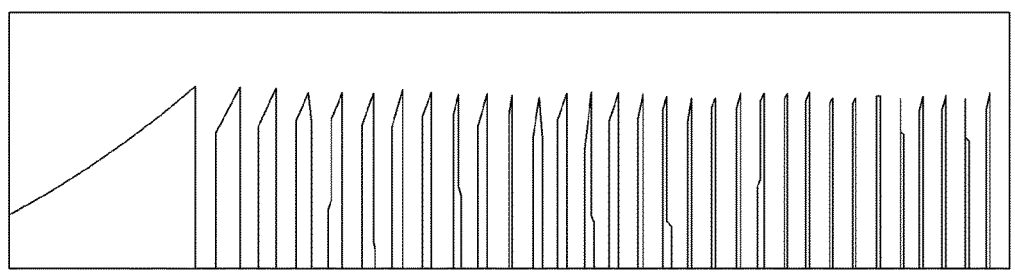
FIG. 10 is a waveform diagram of current in the case of a low load.

On the contrary to the current rising period, the current chopping period is less influenced by the back EMF, and the PWM on time becomes shortened as shown in FIG. 10.

On the other hand, if high load is applied to the step motor as shown in FIG. 8, since the phase difference between the back EMF and the applied current is decreased, the current rising period is less influenced by the back EMF to be shortened, and the current chopping period is relatively lengthened.

Figure 11:
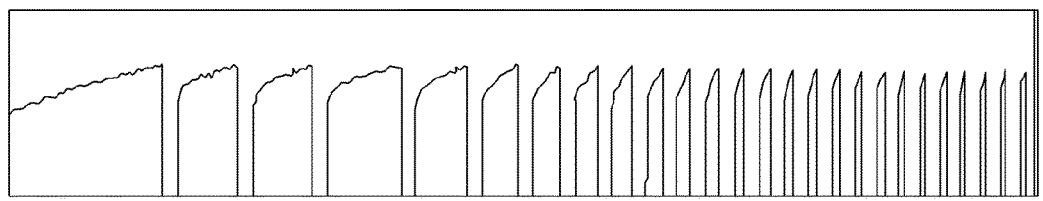
FIG. 11 is a waveform diagram of current in the case of a high load.

In this case, on the contrary to the current rising period, the current chopping period is greatly influenced by the back EMF, and the PWM on time becomes lengthened as shown in FIG. 11.

As a result, as the load becomes higher, the current rising period is shortened, and the chopping period is lengthened. Since the PWM on time is also lengthened in the current chopping period, the volume of the current sensed voltage value is widened in the constant current on period in which repeated switching operation is performed. Accordingly, in this embodiment, the load degree of the step motor is sensed using the volume of the sensed voltage.

On the other hand, referring to FIG. 9, if the step motor is stepped out, the back EMF becomes "0". Although the time interval of the current rising period in the current on period is shortened, the PWM on time in the current chopping period is minimally shortened, and as a result, the volume of the voltage value of the sensing resistor is minimized as compared with the motor rotation period.

Figure 12:
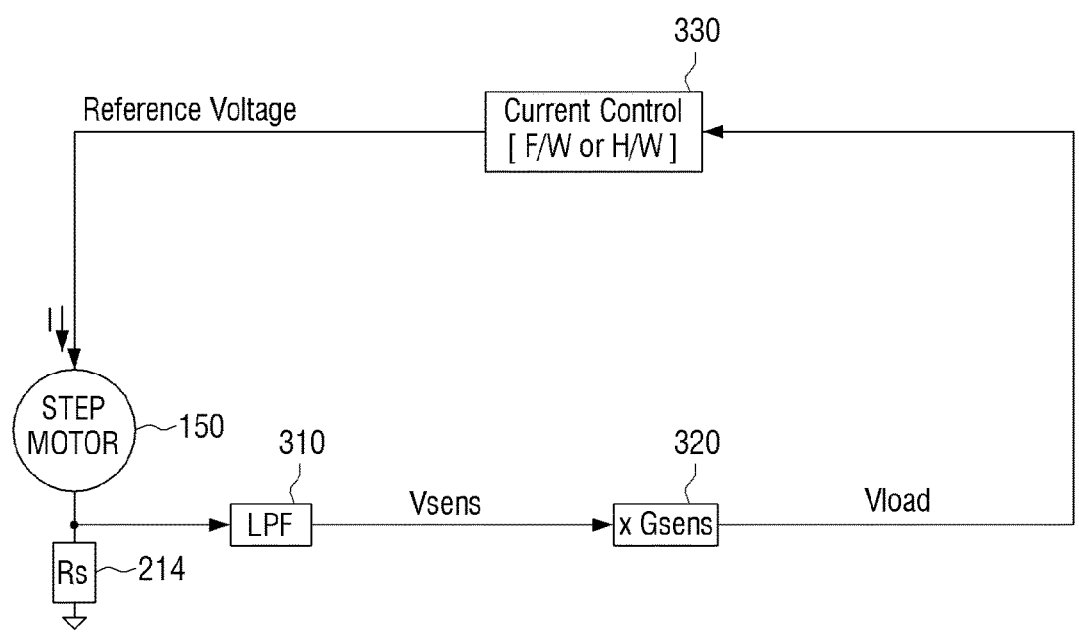
FIG. 12 is a diagram illustrating the configuration of a drive controller according to an exemplary embodiment.

FIG. 12 is a diagram illustrating the configuration of a drive controller according to an exemplary embodiment. Specifically, the drive controller according to this embodiment is an embodiment in which the drive controller outputs the load voltage value using only the sensed voltage value.

Referring to FIG. 12, the drive controller 300 includes a sensor 310, a calculator 320, and a determinator 330.

The sensor 310 senses the voltage value of the sensing resistor 214, and outputs the volume of the sensed voltage value of the sensing resistor 214 as the sensed voltage value Vsens. Specifically, the sensor 310 includes a second-order low pass filter composed of a resistor and a capacitor. In this embodiment, the sensor 310 is implemented as the second-order low pass filter. However, the sensor 310 may also be implemented as a first-order low pass filter or three or more-order low pass filter. Further, the sensor 310 may be implemented by an integrator in addition to the low pass filter.

The calculator 320 may calculate the load voltage based on the sensed voltage value that is output from the sensor 310. Specifically, the calculator 320 may be implemented by an amplifier, and output a value obtained by multiplying the sensed voltage value output from the sensor 310 by the gain Gsens. Here, the gain Gsens is a gain by which the sensed voltage value is multiplied in order to increase the control resolution of the sensed voltage value. During implementation, the gain may be determined so that "Vsens×Gsens" value has a value in a possible wide range that is equal to or lower than the logic power level, and may be determined so that the maximum value of the amplifier output becomes smaller than the upper output limit value of the amplifier.

The determinator 330 determines the constant current control value Vref to be provided to the driver 210 based on the load voltage output from the calculator 320. The detailed operation of the determinator 330 will be described later with reference to FIGS. 15 and 16.

On the other hand, during implementation, a load sensing device that outputs the load level of the step motor using only the configuration of the sensor 310 and the calculator 320 as described above may be implemented.

Figure 13:
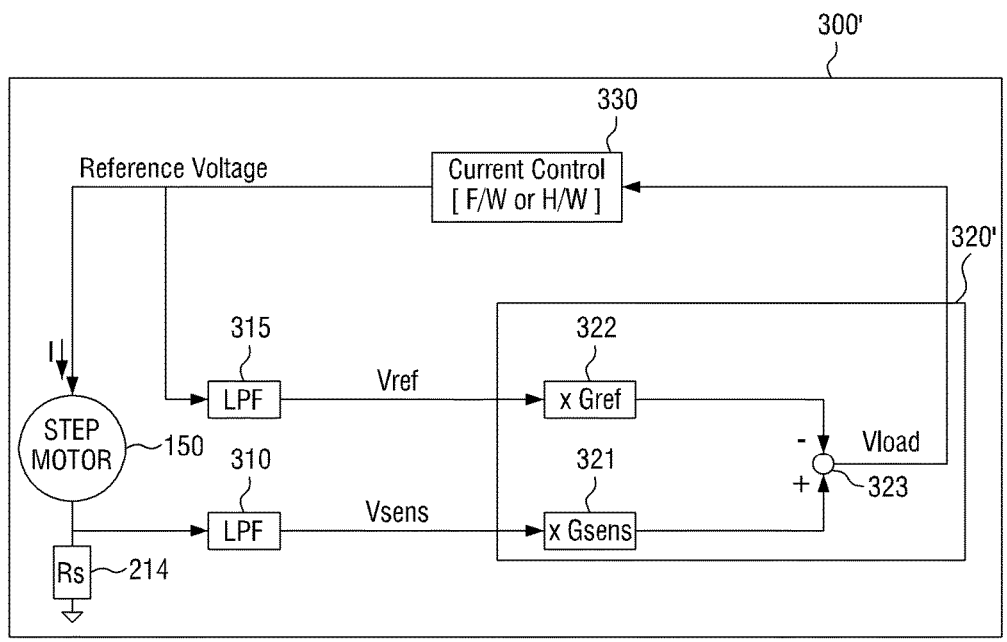
FIG. 13 is a diagram illustrating the configuration of a drive controller according to another exemplary embodiment.
Figure 14:
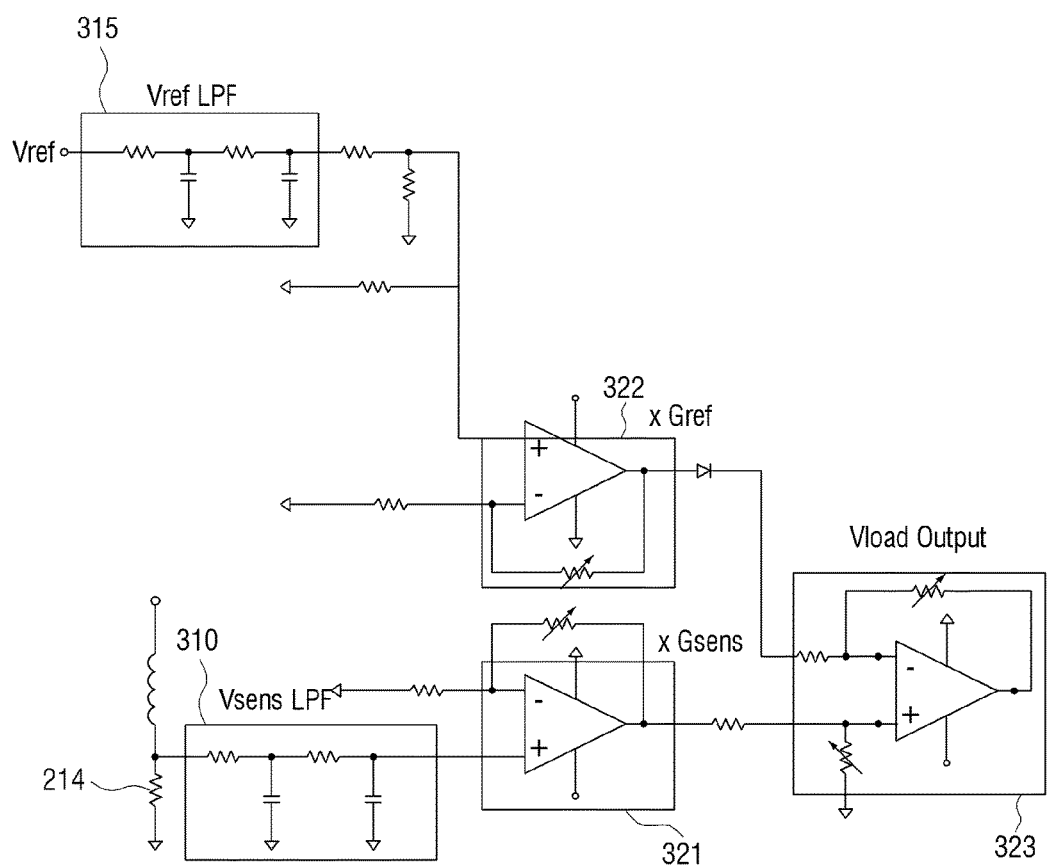
FIG. 14 is a circuit diagram of a drive controller according to the exemplary embodiment of FIG. 13.

FIG. 13 is a diagram illustrating the configuration of a drive controller according to another exemplary embodiment, and FIG. 14 is a circuit diagram of a drive controller according to this embodiment. Specifically, the drive controller according to this embodiment is one in which the drive controller calculates the load level using the sensed voltage value and the constant current control value.

Referring to FIGS. 13 and 14, the drive controller 300' includes a sensor 310, a second sensor 315, a calculator 320', and a determinator 330.

The sensor 310 senses the voltage value of the sensing resistor 214, and outputs the volume of the sensed voltage value of the sensing resistor 214 as the sensed voltage value Vsens. Specifically, the sensor 310 includes a second-order low pass filter comprising a resistor and a capacitor. In this embodiment, the sensor 310 is implemented by the second-order low pass filter. However, the sensor 310 may also be implemented by a first-order low pass filter or three or more-order low pass filter. Further, the sensor 310 may be implemented by an integrator in addition to the low pass filter.

The second sensor 315 senses the constant current control value Vref provided from the driver 310. Specifically, the second sensor 315 includes a second-order low pass filter comprising a resistor and a capacitor. In this embodiment, the second sensor 315 is implemented by the second-order low pass filter. However, the second sensor 315 may also be implemented by a first-order low pass filter or three or more-order low pass filter. Further, the second sensor 315 may be implemented by an integrator in addition to the low pass filter. On the other hand, unlike the sensed voltage value, the constant current control value Vref has a relatively constant value, and during implementation, the constant current control value Vref may be directly output to the calculator 320' without low pass filtering.

The calculator 320' may calculate the load level of the step motor based on the sensed voltage value output from the sensor 310 and the constant current control value output from the second sensor 315. Specifically, the calculator 320' may include a first amplifier 321, a second amplifier 322, and a comparator 323.

The first amplifier 321 multiplies the sensed voltage value Vsens output from the sensor 310 by the amplification gain Gsens to output the multiplied voltage value. Here, the gain Gsens is a gain by which the sensed voltage value is multiplied in order to increase the control resolution of the sensed voltage value. During implementation, the gain Gsens may be determined so that "Vsens×Gsens" value has a value in a possible wide range that is equal to or lower than the logic power level, and may be determined so that the maximum value of the amplifier output becomes smaller than the upper output limit value of the amplifier.

The second amplifier 322 multiplies the constant current control value Vref output from the second sensor 315 by the amplification gain Gref to output the multiplied voltage value. Here, the gain Gref may be determined through Equation 2 as described above.

The comparator 323 outputs a difference between the output value of the first amplifier 321 and the output value of the second amplifier 322. Specifically, the comparator 323 may output the difference between the output value of the first amplifier 321 and the output value of the second amplifier 322 as the load voltage value.

The determinator 330 determines the constant current control value Vref to be provided to the driver 210 based on the load voltage value output from the calculator 320'. The detailed operation of the determinator 330 will be described later with reference to FIGS. 15 and 16. Here, the determined constant current control value Vref is provided to the driver 210.

The drive controller 300' according another exemplary embodiment of the present disclosure outputs the load level in consideration of the constant current level that flows to the step motor, and can output the load level of the step motor more precisely than that according to the previous exemplary embodiment.

As described above, the method of measuring the load level of the step motor using the sensed voltage value has been described. Hereinafter, a method of varying the constant current based on the measured load level will be described with reference to FIGS. 15 to 17.

Figure 15:
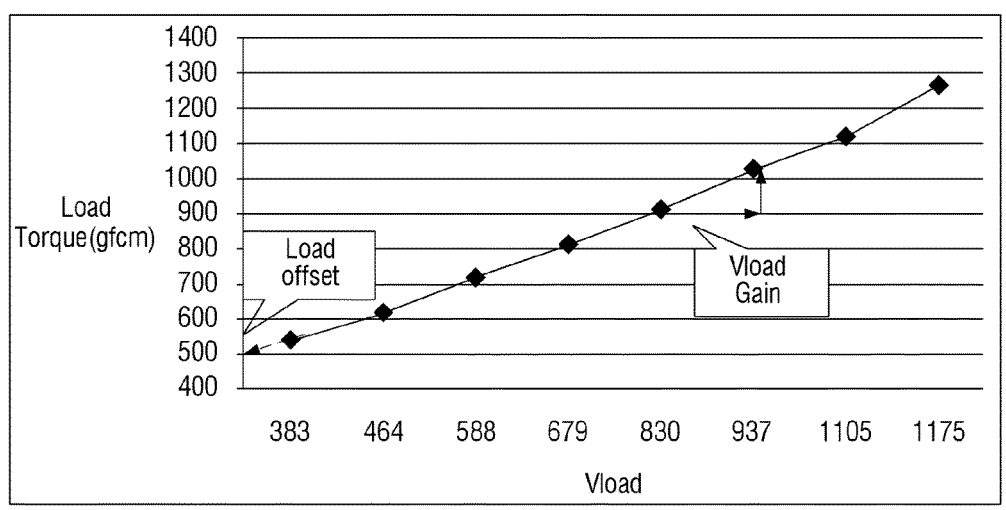
FIG. 15 is a diagram illustrating the relationship between a load voltage value and a load according to the exemplary embodiment of FIG. 13.

FIG. 15 is a diagram illustrating the relationship between the load voltage value and the load according to this exemplary embodiment.

Referring to FIG. 15, the load voltage value is linearly changed with respect to the load change.

Accordingly, the image forming apparatus 100 can measure the load voltage value according to the load torque change on motor components to be used and speed conditions. The relationship between the load and the load voltage value may be derived using Equation 3 below through curve fitting.

$$\text{Load Torque}[gfgm] = V\text{loadGain} \times V\text{load}[V] + \text{LoadOffset} \quad \text{[Equation 3]}$$

Here, the Load Torque is a demand torque of the step motor, VloadGain is a tilt constant, Vload is a load voltage value, and LoadOffset is a minimum torque constant.

The image forming apparatus 100 may measure the input current value according to the maximum torque demand amount. Such a value may be measured through experiments, and may be calculated through Equation 4 below. For example, the values measured through the experiments are as shown in FIG. 16.

$$\text{Input Current}(A) = \text{Rated Input Current} \times (\text{Max Torque}(A)/\text{Rated Torque}) \quad \text{[Equation 4]}$$

Here, the input current is a current value to be input to the step motor, the rated input current is a current value to be input to the step motor on a determined condition, Max Torque (A) is a torque demanded by the step motor, and the rated torque is a torque on the determined condition.

Accordingly, if information on the load level is received through the calculator 320, the determinator 330 may calculate the demanded torque that corresponds to the received load level, may calculate a necessary constant current level that corresponds to the demanded torque through Equation 4 as described above, or may determine the necessary constant current level using a designated lookup table.

As described above, the torque that corresponds to the load level is calculated, and the constant current that corresponds to the calculated torque is determined. That is, the constant current is determined in two stages. However, the constant current that corresponds to the sensed load level may also be determined using a lookup table having constant current values that correspond to a plurality of load levels.

As described above, the constant current that corresponds to the torque that is demanded in the step motor is determined. However, regarding the real-use conditions of the image forming apparatus, the constant current may be determined through addition of a margin torque to the demanded torque. That is, as the constant current voltage value that is provided to the driver 210, a value that is obtained by adding the predetermined margin current to the constant current that is necessary for the load level may be provided.

The constant current calculation operation may be performed in real time, and may be performed in a predetermined period.

Figure 17:
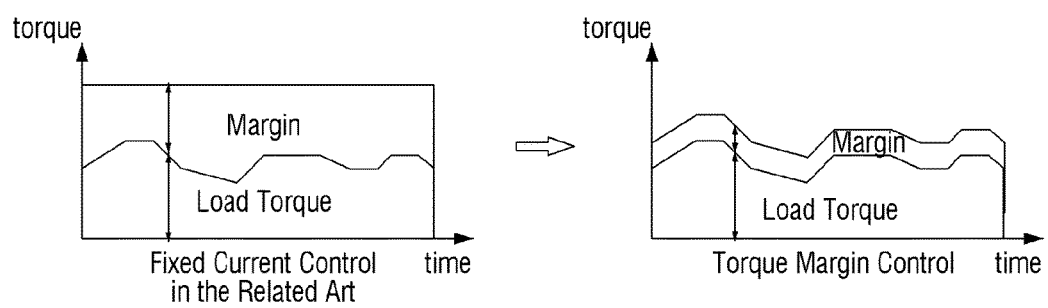
FIG. 17 is a diagram explaining effects according to this embodiment.

FIG. 17 is a diagram illustrating the control effects of the torque margin.

As illustrated in FIG. 17, if the constant current level is varied according to the load level according to this embodiment, the step motor can be driven with the minimum margin. Accordingly, the step motor can start at high efficiency, and noise, vibration, and heating of the step motor can be reduced.

As described above, the step motor is controlled by the torque margin method. During implementation, however, the step motor may be controlled by a high/low limit method. This will be described with reference to FIGS. 18 to 21.

Figure 18:
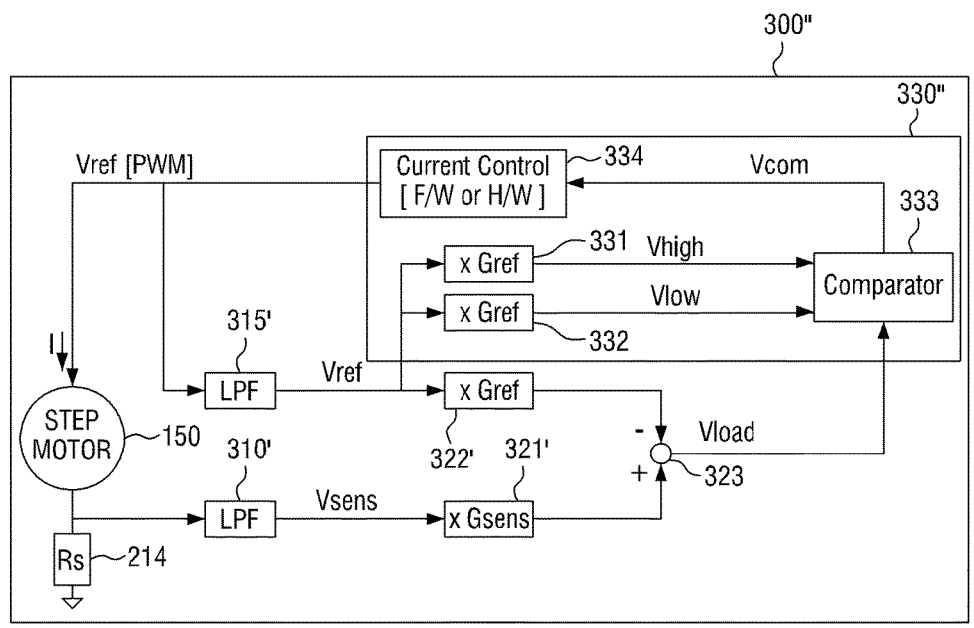
FIG. 18 is a diagram illustrating the configuration of a drive controller according to yet another exemplary embodiment.
Figure 19:
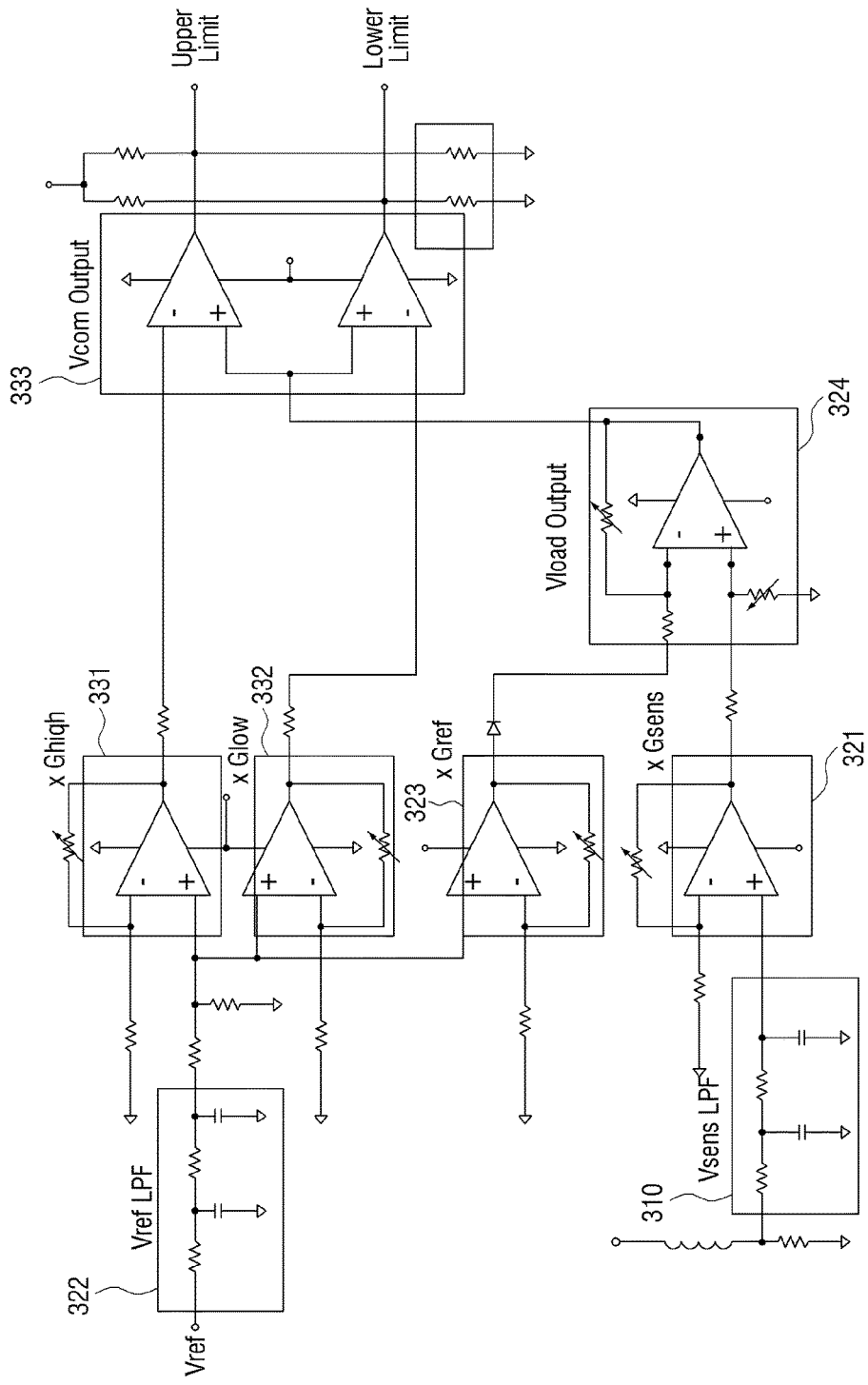
FIG. 19 is a circuit diagram of a drive controller according to the exemplary embodiment of FIG. 18.

FIG. 18 is a diagram illustrating the configuration of a drive controller according to yet another exemplary embodiment, and FIG. 19 is a circuit diagram of the drive controller according to this exemplary embodiment.

Referring to FIGS. 18 and 19, the drive controller 300" includes a first sensor 310, a second sensor 315', a calculator 320', and a determinator 330'.

Since the configurations and operations of the first sensor 310', the second sensor 322", and the calculator 320" are the same as those of the drive controller according to the previous embodiment as described above with reference to FIGS. 13 and 14, a duplicate description thereof will be omitted.

The determinator 330" stores a predetermined constant current value, a predetermined first load level value, and a predetermined second load level value, and if the calculated load level is higher than or is lower than the first load level value and the second load level value, the determinator 330" adjusts the constant current value, the first load level value, and the second load level value. Here, the first load level is an upper limit of the load, and is adjusted in proportion to the constant current control value Vref. Further, the second load level is a lower limit of the load, and is adjusted in proportion to the constant current control value Vref. Accordingly, if the load level Vload is higher than the first load level, the determinator 330" increases the current supply through increasing the constant current control value Vref. By contrast, if the load level Vload is lower than the second load level, the determinator 330" may reduce the current supply through decreasing the constant current control value Vref.

Specifically, the determinator 330" may include a third amplifier 331, a fourth amplifier 332, a comparator 333, and a determination circuit 334.

The third amplifier 331 multiplies the constant current value by the predetermined upper limit gain to output the multiplied constant current value.

The fourth amplifier 332 multiplies the constant current value by the predetermined lower limit gain to output the multiplied constant current value.

The comparator 333 determines whether the load level voltage value is larger than the value of the third amplifier 331 or is smaller than the value of the fourth amplifier 332. Specifically, if the load level voltage value is larger than the value of the third amplifier 331, the comparator 333 may output control information Vcom to notify that the constant current level should be increased to the determination circuit 334. By contrast, if the load level voltage value is smaller than the value of the fourth amplifier 332, the comparator 333 may output control information Vcom to notify that the constant current level should be decreased to the determination circuit 334.

The determination circuit 334 increases or decreases the predetermined constant current level based on the control information Vcom that is provided from the comparator 333 to output the increased or decreased constant current level.

Specifically, the determination circuit 334 may vary, by software, the constant current that is supplied to the step motor through adjustment of the PWM duty based on the provided control information. Further, the determination circuit 334 may increase or decrease, by hardware, the predetermined constant current level based on the provided control information. A case where the determination circuit 334 is implemented by hardware will be described hereinafter with reference to FIG. 20.

Figure 20:
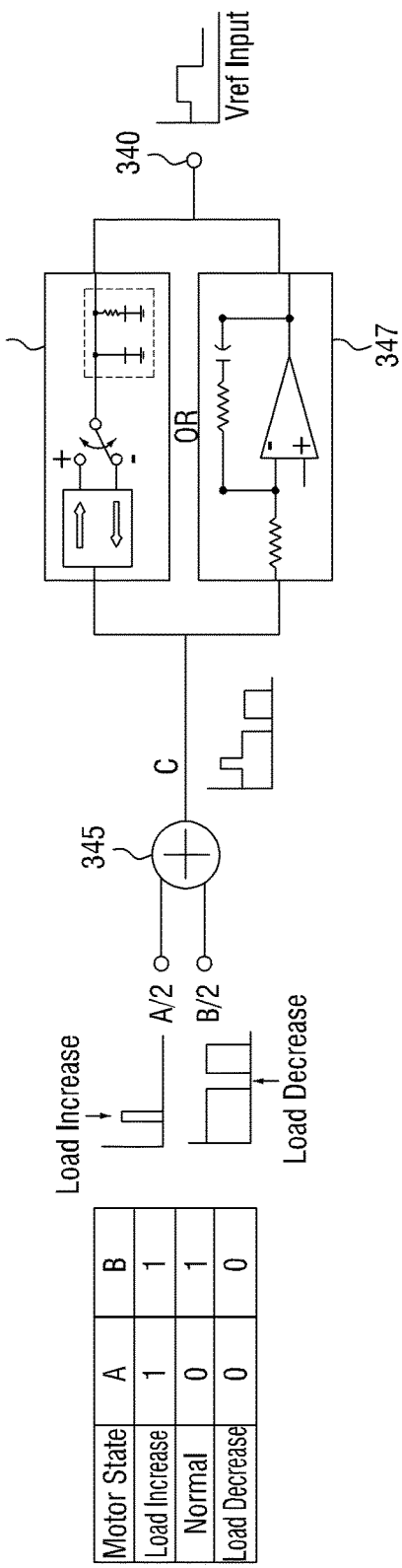
FIG. 20 is a circuit diagram of a determination circuit in FIG. 18.

FIG. 20 is a circuit diagram of the determination circuit 334 in FIG. 18. Specifically, FIG. 20 is a circuit diagram of the determination circuit that is implemented by hardware.

Referring to FIG. 20, the determination circuit 334 includes an adder 345 and integration circuits 346 and 347.

The adder 345 receives the control information Vcom that is provided from the comparator 333 as two input signals. The adder 345 may add the two input signals Va and Vb to output the added signal C.

The integration circuits 346 and 347 integrate the output signal of the adder 345 and convert the integrated output signals into a specific voltage level to output the converted voltage level. The integration circuit may be implemented by a charge pump 346 or an active filter 347.

Figure 21:
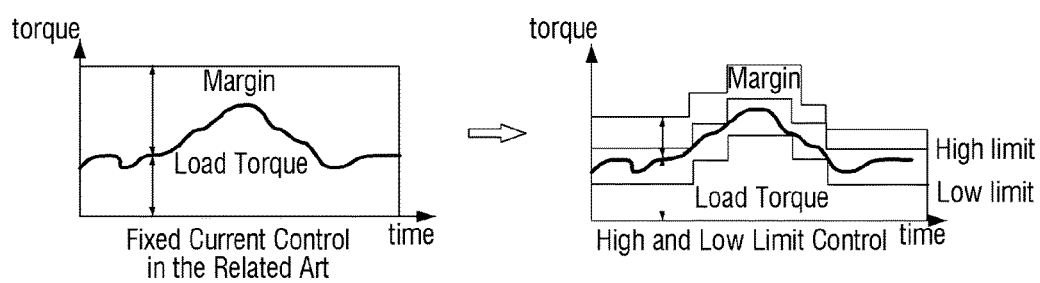
FIG. 21 is a diagram explaining the operation of a drive controller according to the exemplary embodiment of FIG. 18.

FIG. 21 is a diagram explaining the operation of the drive controller according to still another embodiment.

Referring to FIG. 21, according to the control method in the related art, the constant current is supplied. However, in the high/low limit control, the supply current is maintained within a predetermined range, and if the load is increased over the high limit, the input current is increased, while if the load is decreased, the input current is decreased to make the current variable control become possible. The high/low limit control as described above may be used in combination with different drive controllers according to the previous embodiments, and particularly in the case of the different drive controller according to the embodiment illustrated in FIG. 2, it is preferable to use the high/low limit control.

Figure 22:
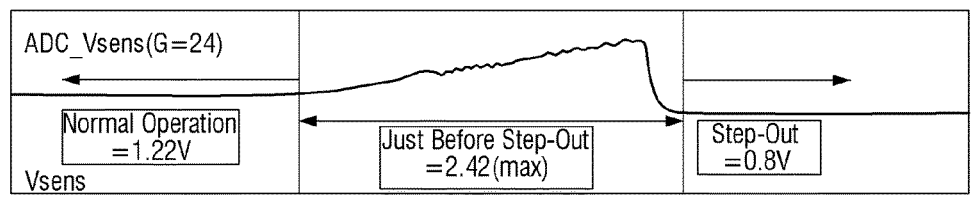
FIG. 22 is a waveform diagram illustrating a load voltage value according to a motor rotation state.

FIG. 22 is a waveform diagram illustrating a load voltage value according to a motor rotation state.

Referring to FIG. 22, in the case where the step motor is stepped out, the voltage value of the sensing resistor becomes small in comparison to the case of a normal driving. Since the reason is described in FIG. 9, the duplicate explanation thereof will be omitted.

Accordingly, by reading the load voltage values Vload at predetermined intervals during the motor driving, it is possible to always observe the state of the step motor. That is, if the sensed load voltage value Vload is increased over the load voltage value Vload that corresponds to the maximum load torque of the image forming apparatus, it become possible to sense that the load state is in an abnormal state, while if the sensed load voltage value Vload in the rotating state is lowered to the minimum value, it can be notified that the step motor is stepped out.

Further, it can be examined whether an inferior motor is mounted on the image forming apparatus 100 using the load voltage value Vload, and by the resistance value difference, it is possible to discriminate the kinds of motors. Accordingly, the above-described load voltage value may be used in detecting the inferior motor or misassembly even in a state where the set is completely assembled in the manufacturing process.

FIG. 23 is a diagram illustrating an image forming apparatus according to yet another embodiment of the present disclosure. Specifically, all the configurations except for the motor control apparatus of FIG. 1 and the step motor 150 are the same as those of FIG. 1, and for convenience in explanation, the duplicate configurations will be omitted from illustration.

Referring to FIG. 23, an image forming apparatus includes a plurality of step motors 150-1, 150-2, 150-3, and 150-4 and a motor control apparatus 200'.

The motor control apparatus 200' controls the plurality of step motors 150-1, 150-2, 150-3, and 150-4. Specifically, the motor control apparatus 200' may include a plurality of drivers and one drive controller.

The motor control apparatus 200' receives control commands for the plurality of step motors, and the motor control apparatus 200' may control the plurality of drivers to measure the load levels of the plurality of step motors and to provide the constant current that corresponds to the measured load level.

In this embodiment, it is illustrated that the motor control apparatus 200' controls four step motors. During implementation, however, the motor control apparatus 200' may be implemented to control a BLDC motor and a DC motor while generating the driving signal for the step motor.

Figure 24:
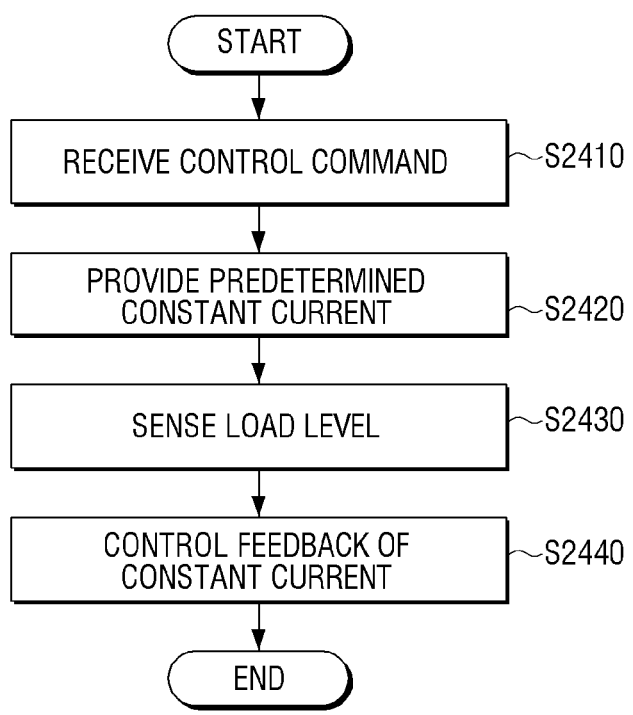
FIG. 24 is a flowchart illustrating a method of controlling a motor according to an exemplary embodiment of the present disclosure.

FIG. 24 is a flowchart illustrating a method of controlling a motor according to an embodiment of the present disclosure.

Referring to FIG. 24, a control command for the step motor is received (operation S2410). Here, the control command may include a start/stop of rotation of the step motor, an acceleration/deceleration, or a speed command value. The control command may be control commands for the plurality of step motors.

Then, the load level of the step motor is sensed using the voltage value of the resistor for measuring current that flows to the coil of the step motor (operation S2430). Since the method for sensing the load level of the step motor has been described with reference to FIGS. 4 to 6, the duplicate description thereof will be omitted.

Then, the feedback control is performed to supply the constant current that corresponds to the sensed load level (operation S2440). Since the method of varying the constant current according to the sensed load level has been described with reference to FIGS. 15 to 21, the duplicate description thereof will be omitted.

As described above, according to the motor control method according to this embodiment, the load level of the step motor is measured, and the constant current that corresponds to the measured load level is provided. Accordingly, the motor can be controlled at high efficiency, and the noise, vibration, and heating of the step motor can be reduced. The motor control method as shown in FIG. 24 may be performed by the image forming apparatus 100 having the configuration of FIG. 1 or the motor control apparatus having the configuration of FIG. 2, and may be further performed by an image forming apparatus or a motor control apparatus having other configurations.

Further, the motor control method as described above may be implemented by a program (or application) that includes an executable algorithm that can be executed by a computer, and the program may be stored and then provided in a non-transitory computer readable medium.

The non-transitory computer readable medium is not a medium that stores data for a short period, such as a register, a cache, or a memory, but refers to a medium which semi-permanently stores data and is readable by a device. Specifically, various applications and programs as described above may be stored and provided in the non-transitory computer readable medium, such as, a CD, a DVD, a hard disc, a Blu-ray disc, a USB, a memory card, and a ROM.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:
1. An image forming apparatus, comprising:
   an engine portion to perform an image forming job;
   a step motor, including a plurality of coils, to start the engine portion;
   a driver to provide a predetermined constant current to a selected coil among the plurality of coils of the step motor, the driver including:
      a driver circuit,
      a coil selector, switchable to each of the plurality of coils, to switch to the selected coil among the plurality of coils, according to a control of the driver circuit, so that the predetermined constant current is supplied to the selected coil, and
      a sensing resistor, connected in series with the selected coil and having one end connected to the coil selector and another end connected to ground, to measure a current that flows to the selected coil; and
   a drive controller to sense a voltage value of the sensing resistor, to measure a load level of the step motor based on the sensed voltage value of the sensing resistor, to control the driver to provide the predetermined constant current that corresponds to the measured load level, and to determine whether the step motor is normally operated through a comparison of the measured load level with pre-stored load level information during the normal operation, the drive controller including a sensor to sense the voltage value of the sensing resistor, the sensor including a first low pass filter, connected to the one end of the sensing resistor of the driver, to sense an output voltage of the low pass filter as the voltage value of the sensing resistor, and wherein the drive controller further includes:
- a second low pass filter to sense a constant current control value based on the predetermined constant current provided by the driver to the selected coil,
- a first amplifier to amplify the sensed voltage value according to a first predetermined gain value to produce a first output value,
- a second amplifier to amplify the sensed constant current control value according to a second predetermined gain value to produce a second output value,
- a comparator to output a difference between the first output value and the second output value to obtain the measured load level of the step motor, and
- a determinator to determine the predetermined constant current to be supplied to the step motor based on the measured load level.

2. The image forming apparatus as claimed in claim 1, wherein the drive controller further comprises:
an outputter to output the constant current control value that corresponds to the determined predetermined constant current to be supplied to the step motor.

3. The image forming apparatus as claimed in claim 2, wherein the sensor smoothes and senses the voltage value of the sensing resistor.

4. The image forming apparatus as claimed in claim 1, wherein
the first amplifier and the second amplifier are included in a calculator of the drive controller, and
the calculator calculates the load level of the step motor based on a following equation, $$Vload = Vsens * Gsens - (Vref \times Gref)$$

where, Vload denotes the voltage value that corresponds to the calculated load level, Vsens denotes the sensed voltage value, Vref denotes the sensed constant current control value, Gsens is the first predetermined gain value, and Gref is the second predetermined gain value.

5. The image forming apparatus as claimed in claim 1, wherein the determinator determines the predetermined constant current using a lookup table having the predetermined constant current that corresponds to levels of a plurality of loads.

6. The image forming apparatus as claimed in claim 5, wherein the determined predetermined constant current is obtained by adding predetermined margin current to necessary constant current of the measured load level.

7. The image forming apparatus as claimed in claim 1, wherein a plurality of step motors and drivers are provided, and
the drive controller measures load levels of the plurality of step motors, and controls the plurality of drivers to provide a predetermined constant current that corresponds to the measured load levels.

8. A motor control apparatus, comprising:
a step motor including a plurality of coils;
a driver to provide a predetermined constant current to a selected coil among the plurality of coils of the step motor, the driver including:
- a driver circuit,
- a coil selector, switchable to each of the plurality of coils, to switch to the selected coil among the plurality of coils, according to a control of the driver circuit, so that the predetermined constant current is supplied to the selected coil, and
- a sensing resistor, connected in series with the selected coil and having one end connected to the coil selector and another end connected to ground, to measure a current that flows to the selected coil; and a drive controller to sense a voltage value of the sensing resistor, to measure a load level of the step motor based on a voltage value of the resistor, to control the driver to provide the predetermined constant current that corresponds to the measured load level, and to determine whether the step motor is normally operated through a comparison of the measured load level with pre-stored load level information during the normal operation, the drive controller including a sensor to sense the voltage value of the sensing resistor, the sensor including a first low pass filter, connected to the one end of the sensing resistor of the driver, to sense an output voltage of the low pass filter as the voltage value of the sensing resistor, and wherein the sensor includes a first low pass filter, connected to the one end of the sensing resistor of the driver, to sense an output voltage of the low pass filter as the voltage value of the sensing resistor, and the drive controller further includes:
- a second low pass filter to sense a constant current control value based on the predetermined constant current provided by the driver to the selected coil,
- a first amplifier to amplify the sensed voltage value according to a first predetermined gain value to produce a first output value,
- a second amplifier to amplify the sensed constant current control value according to a second predetermined gain value to produce a second output value,
- a comparator to output a difference between the first output value and the second output value to obtain the measured load level of the step motor, and
- a determinator to determine the predetermined constant current to be supplied to the step motor based on the measured load level.

9. The motor control apparatus as claimed in claim 8, wherein the drive controller further comprises:
an outputter to output the constant current control value that corresponds to the determined predetermined constant current to be supplied to the step motor.

10. The motor control apparatus as claimed in claim 9, wherein the sensor smoothes and senses the voltage value of the sensing resistor.

11. The motor control apparatus as claimed in claim 8, wherein
the first amplifier and the second amplifier are included in a calculator of the drive controller, and
the calculator calculates the load level of the step motor based on a following equation, $$Vload = Vsens * Gsens - (Vref \times Gref)$$

where, Vload denotes the voltage value that corresponds to the calculated load level, Vsens denotes the sensed voltage value, Vref denotes the sensed constant current control value, Gsens is the first predetermined gain value, and Gref is the second predetermined gain value.

12. The motor control apparatus as claimed in claim 8, wherein the determinator determines the predetermined constant current using a lookup table having the predetermined constant current that corresponds to levels of a plurality of loads.

13. The motor control apparatus as claimed in claim 12, wherein the determined predetermined constant current is obtained by adding predetermined margin current to necessary constant current of the measured load level.

14. The motor control apparatus as claimed in claim 8, wherein
the determinator stores a predetermined constant current value, a predetermined first load level value, and a predetermined second load level value,
if the load level is higher than the predetermined first load level value, the determinator increases the predetermined constant current value, the predetermined first load level value, and the predetermined second load level value, and determines the increased constant current value as the predetermined constant current to be supplied to the step motor based on the measured load level, and
if the load level is lower than the predetermined second load level value, the determinator decreases the predetermined constant current value, the predetermined first load level value, and the predetermined second load level value, and determines the decreased constant current value as the predetermined constant current to be supplied to the step motor based on the measured load level.

15. A method of controlling a step motor including a driver circuit and a plurality of coils, comprising:
switching, by a coil selector switchable to each of the plurality of coils, to a selected coil among the plurality of coils, according to a control of the driver circuit,
measuring a current that flows to the selected coil among the plurality of coils of the step motor;
receiving a control command for the step motor based on the measured current;
providing, by a driver, a predetermined constant current to the step motor according to the received control command, wherein the providing the predetermined constant current includes:
sensing a voltage value of a sensing resistor connected in series with the selected coil and having one end connected to the coil selector and another end connected to ground, the sensing the voltage value including, sensing, by a first low pass filter connected to the one end of the sensing resistor, an output voltage of the low pass filter as the voltage value of the sensing resistor,
sensing, by a second low pass filter, a constant current control value based on the predetermined constant current provided by the driver to the selected coil,
amplifying, by a first amplifier, the sensed voltage value according to a first predetermined gain value to produce a first output value,
amplifying, by a second amplifier, the sensed constant current control value according to a second predetermined gain value to produce a second output value,
outputting, by a comparator, a difference between the first output value and the second output value to measure a load level of the step motor,
determining, by a determinator, the predetermined constant current to be supplied to the step motor based on the measured load level, and
controlling the driver to provide the predetermined constant current that corresponds to the measured load level; and
determining whether the step motor is normally operated through comparison of the measured load level with pre-stored load level information during the normal operation.

* * * * *

UNITED STATES PATENT AND TRADEMARK OFFICE
CERTIFICATE OF CORRECTION

PATENT NO. : 10,171,017 B2  
APPLICATION NO. : 14/177433  
DATED : January 1, 2019  
INVENTOR(S) : Yong-ho You et al.

Page 1 of 1

It is certified that error appears in the above-identified patent and that said Letters Patent is hereby corrected as shown below:

In the Drawings

In sheet 19 of 24, reference numeral 331, Line 1, delete "Ghiqh" and insert -- Ghigh --, therefor.

In the Specification

In Column 7, Line 31, delete "values)" and insert -- values --.

Signed and Sealed this  
Second Day of April, 2019

Andrei Iancu  
*Director of the United States Patent and Trademark Office*